US005507012A

United States Patent [19]

Luxon et al.

[11] Patent Number: 5,507,012
[45] Date of Patent: Apr. 9, 1996

[54] SHIELD APPARATUS FOR ABSORBING MICROWAVE ENERGY FOR HAND HELD TELEPHONES

[76] Inventors: Kevin N. Luxon, 30041 Tessier, Unit 70, Laguna Niguel, Calif. 92677; Norval N. Luxon, 8462 Traminer Ct., San Jose, Calif. 95135

[21] Appl. No.: 283,526

[22] Filed: Aug. 1, 1994

Related U.S. Application Data

[63] Continuation-in-part of Ser. No. 33,569, Mar. 17, 1993.
[51] Int. Cl.$^6$ ................ H04B 1/38; H01Q 1/24
[52] U.S. Cl. ............ 455/89; 455/90; 343/702; 343/841
[58] Field of Search ............... 455/89, 90, 300; 379/59; 343/702, 841; 250/515.1, 516.1, 517.1; 361/816

[56] References Cited

U.S. PATENT DOCUMENTS

| | | | |
|---|---|---|---|
| 5,012,114 | 4/1991 | Sisson, Jr. | 250/516.1 |
| 5,150,282 | 9/1992 | Tomura et al. | 455/300 |
| 5,247,182 | 9/1993 | Servant et al. | 250/516.1 |
| 5,335,366 | 8/1994 | Daniels | 455/90 |

*Primary Examiner*—Reinhard J. Eisenzopf
*Assistant Examiner*—Thanh Le
*Attorney, Agent, or Firm*—John J. Daniels

[57] ABSTRACT

Shield apparatus for portable wireless telephones or personal communication apparatus includes electromagnetic radio frequency radiation absorption and blocking materials disposed about the antenna and any other electromagnetic transmitting portion of the wireless portable telephone or personal communication apparatus adjacent to, or in the direction of, the user of the wireless communication apparatus. The absorption and blocking or shield area absorbs and blocks the radiation and protects the user from the radiation, and metallic elements redirect the electromagnetic radiation away from the user and extend the transmission range of the communication apparatus. The portion of the antenna remote from the user is free or open, and thus permeable to the electromagnetic radiation, typically in the microwave frequency band, so that the communication signal may be appropriately transmitted from the wireless portable telephone or personal communication apparatus, and may be received by the hand held portable telephone or personal communication apparatus.

16 Claims, 3 Drawing Sheets

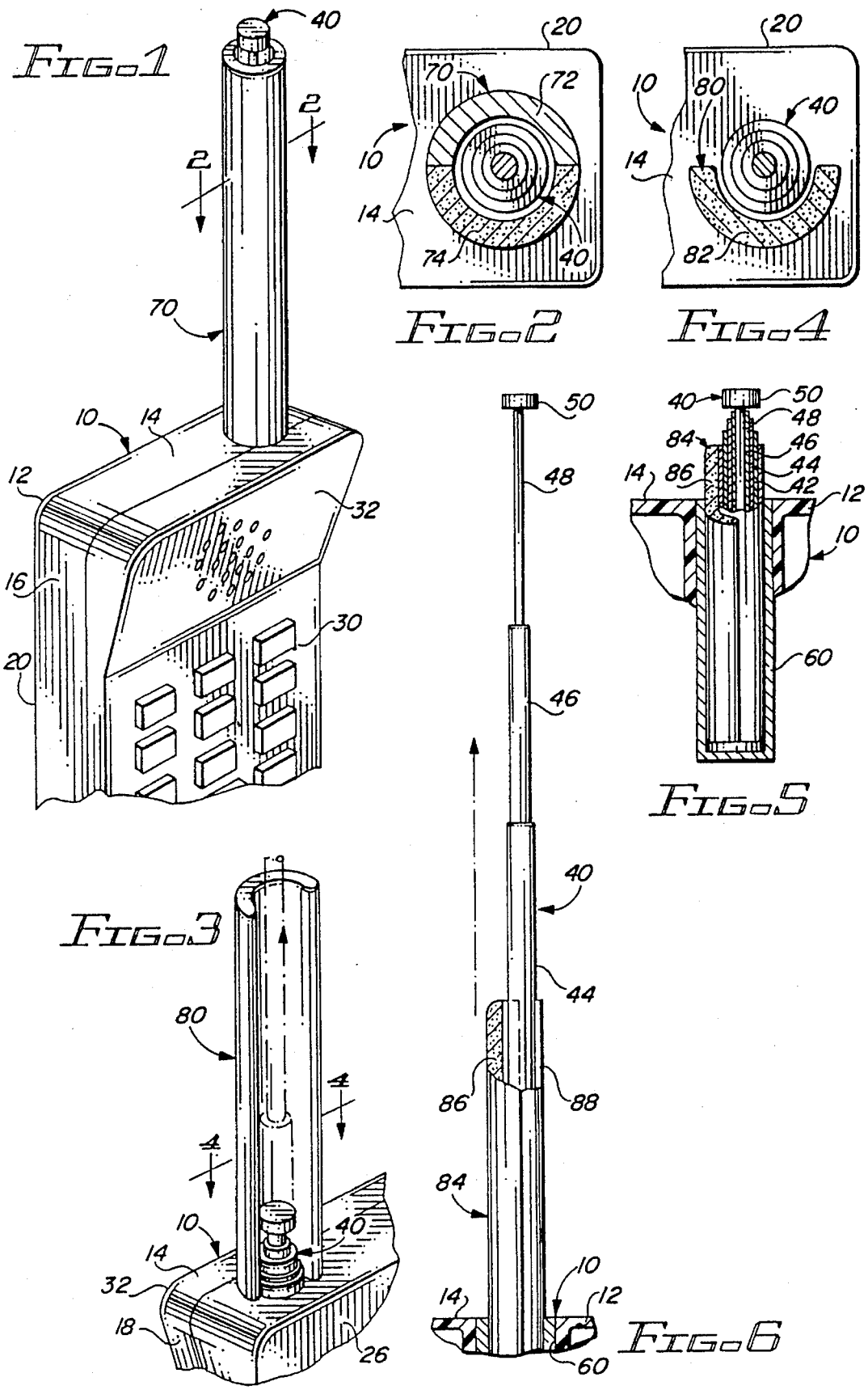

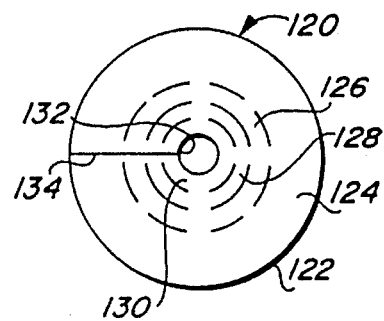
FIG-10
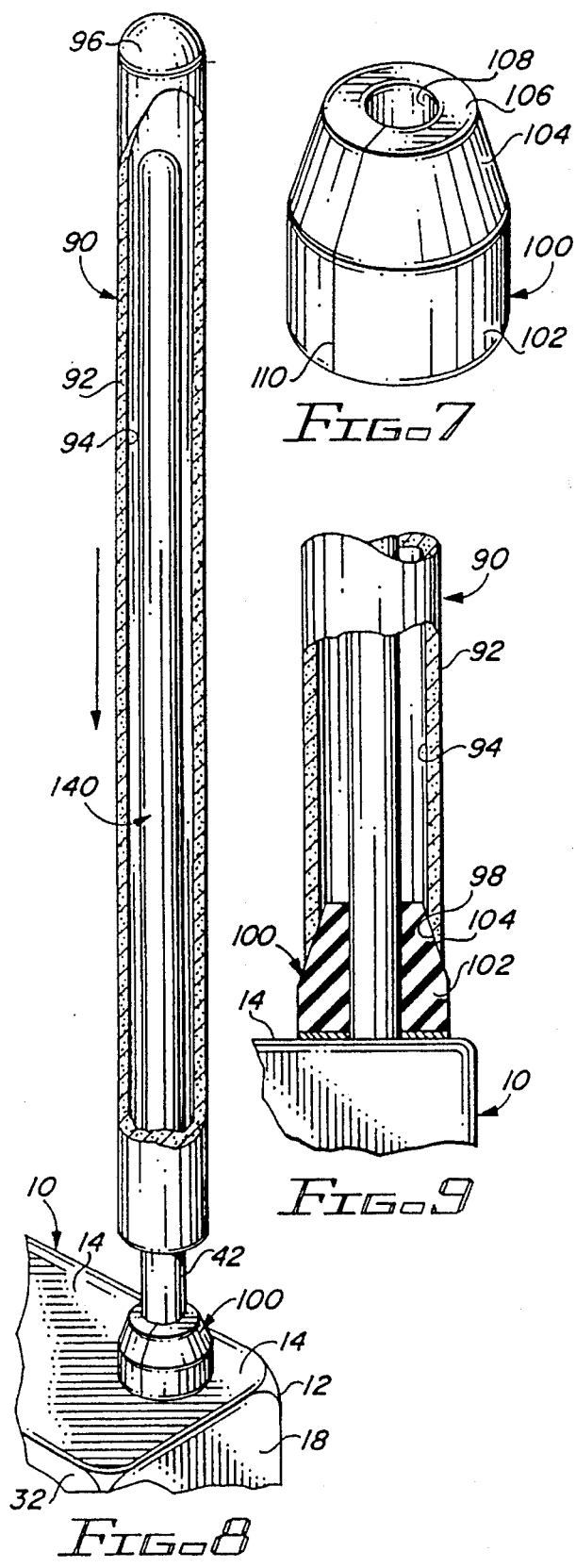
FIG-7
FIG-9
FIG-8
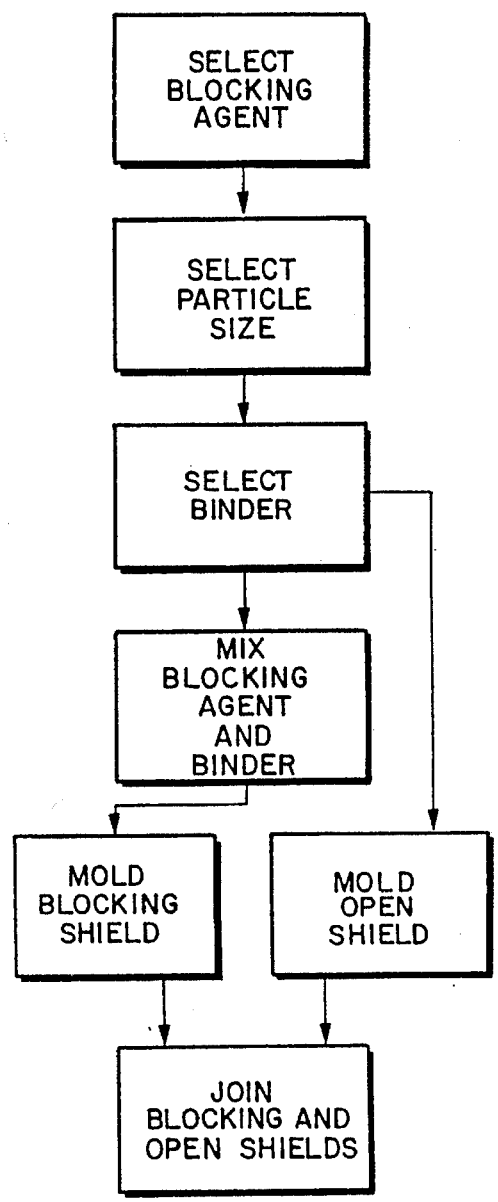
FIG-11

5,507,012

SHIELD APPARATUS FOR ABSORBING MICROWAVE ENERGY FOR HAND HELD TELEPHONES

CROSS REFERENCE TO RELATED APPLICATION

This application is a Continuation In Part application of Ser. No. 08/033,569, filed Mar. 17, 1993.

BACKGROUND OF THE INVENTION

1. Field of the Invention

This invention relates to portable telephone and other personal communication apparatus and, more particularly, to protective shield apparatus for absorbing microwave energy to protect a user of the portable telephone and personal communication apparatus from the electromagnetic microwave frequency radiation emanating from such apparatus and to extend the transmission range of such apparatus by redirecting the microwave radiation away from the user of the apparatus.

2. Description of the Prior Art

There have been a number of contemporary inquiries regarding the safety of portable telephones and, more particularly, cellular telephones and wireless communication devices, with respect to the potential danger to the user from electromagnetic microwave radiation associated with the transmission of the signals from such apparatus. Contemporary inquiries are investigating the possibilities that the radiation may cause cancer or create other health risks or hazards to the user in association with the use of such apparatus. In response thereto, the apparatus of the present invention utilizes electromagnetic radiation absorbing materials disposed about the antenna and portable wireless transmitting apparatus and between the user and the antenna and transmitting apparatus to shield or protect the user from the potentially harmful radiation emissions from the wireless communication apparatus, and to extend the transmission range of such apparatus by redirecting the microwave radiation away from the user of the apparatus.

Typically, the broadcast from the portable telephones and wireless communication apparatus emit electromagnetic radiation in the microwave frequency range. The shield apparatus of the present invention is disposed primarily about the antenna and transmitting apparatus both inside and outside of the portable telephone and wireless communication apparatus itself.

SUMMARY OF THE INVENTION

The invention described and claimed herein comprises shield apparatus for shielding the antenna and related transmitting elements in portable telephones and other wireless communication apparatus. The shield apparatus includes portions which block by absorption the microwave radio frequency radiation which is directed toward the user of the apparatus, and allows the microwave radiation to be redirected and broadcast outwardly from the antenna in the directions away from the user and thus extend the transmission range of the apparatus.

Among the objects of the present invention are the following:

To provide new and useful radiation absorption and blocking apparatus;

To provide new and useful apparatus for portable telephones and wireless communication apparatus to block electromagnetic radio frequency radiation from reaching the user of such apparatus;

To provide new and useful portable telephone and wireless communication apparatus for directing microwave energy away from a user of the apparatus and thereby extend the transmission range of the apparatus;

To provide new and useful shield apparatus for the transmitting apparatus antenna of portable telephone and other wireless communication apparatus;

To provide new and useful hand held communications apparatus which includes shielding for the user and which directs radiation away from the user and extends the transmission range of the apparatus by directing the radiation away from the user;

To provide universal shield apparatus for the antenna of a hand held portable telephone and wireless communication apparatus; and To provide new and useful radiation blocking apparatus between hand held portable telephone and other wireless communication apparatus and the user thereof.

BRIEF DESCRIPTION OF THE DRAWING

FIG. 1 is a perspective view of the apparatus of the present invention in its use environment.

FIG. 2 is a view in partial section taken generally along line 2—2 of FIG. 1.

FIG. 3 is a perspective view of an alternate embodiment of the apparatus of FIGS. 1 and 2.

FIG. 4 is a view in partial section taken generally along line 4—4 of FIG. 3.

FIG. 5 is a side view in partial section of an alternate embodiment of the present invention.

FIG. 6 is a side view in partial section illustrating the functioning of the antenna apparatus associated with the present invention.

FIG. 7 is a perspective view of an element which comprises an alternate embodiment of the apparatus of the present invention.

FIG. 8 is a perspective view, partially broken away, sequentially illustrating the operation of an alternate embodiment of the apparatus of the present invention with the element of FIG. 7.

FIG. 9 is a sequential view illustrating the operation of the elements illustrated in FIGS. 7 and 8.

FIG. 10 is a top view of an alternate embodiment of the apparatus of FIG. 7.

FIG. 11 is a block diagram illustrating the fabrication of the apparatus of the present invention.

DESCRIPTION OF THE PREFERRED EMBODIMENT

Figure 12:
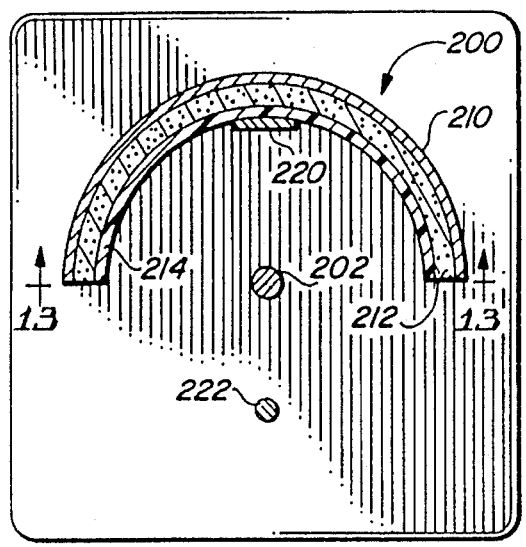
FIG. 12 is a top view of an alternate embodiment of the radiation shield and microwave redirection and range extension apparatus of the present invention.

For purposes of illustrating the present invention, a portable telephone or wireless personal communication apparatus 10 is shown, and only a few portions of such apparatus are identified in the drawing figures and will be discussed. The same basic portable telephone or wireless personal communication apparatus 10 is shown with different antenna configurations and with different protective shield and microwave redirection and range extension embodiments in the drawing figures.

The telephone or personal communication apparatus 10 is shown as including a case 12 and having a top 14. Two sides of the telephone or personal communication apparatus case 12 are shown, a side 16 in FIG. 1 and a side 18 in FIGS. 3 and 8.

The telephone or personal communication apparatus 10 includes a front which has a key pad 30 in the central portion of the apparatus and a speaker 32 in the upper portion. The telephone or personal communication apparatus 10 also includes a back 26, shown in FIG. 3.

FIG. 1 is a perspective view the of telephone or personal communication apparatus 10. The apparatus 10 is a hand held, wireless telephone or personal communication apparatus, which may typically be a cellular telephone or other type of hand held and/or cordless telephone or wireless personal communication apparatus. An antenna 40 extends upwardly from the top 14.

In FIGS. 1–6, the antenna 40 is shown as a telescoping antenna, such as is typically used in portable telephones or wireless personal communication apparatus. Obviously, the antenna may also be a fixed length antenna, such as typically used in cellular telephones, as shown in FIGS. 8 and 9.

With the same basic portable telephone or personal communication apparatus 10, and the same basic antenna 40, several different embodiments of shield apparatus are shown.

FIG. 2 is a top view of the telephone apparatus 10 shown in FIG. 1 taken generally along line 2—2. FIG. 2 shows the top 14 of the telephone or personal communication apparatus 10. The antenna 40 is disposed within a shield and microwave redirection and range extension apparatus 70. The shield apparatus 70 is shown in both FIGS. 1 and 2.

The shield and microwave redirection and range extension apparatus 70 is a generally cylindrical element, with the cylindrical element having two portions, an open portion 72 and an absorbing and microwave redirection portion 74. That is, there is a portion of the cylindrical shield 70 which is open to electromagnetic microwave radio frequency radiation. The portion 72 is the open portion in that microwave radio frequency radiation will pass through the portion 72 without any blocking or absorbing of the radiation.

However, the portion 74 is the absorbing and microwave radiation redirection portion and will absorb, block, and redirect the radiation to shield the user of the telephone or wireless personal communication apparatus 10 from the potentially harmful effects of the microwave radio frequency radiation emanating from the antenna. In addition, the portion 74 extends the transmission range of the apparatus 10 by redirecting the microwave radiation away from the user.

It will be noted that the shield and microwave redirection apparatus 70 is of a limited or finite height. The antenna 40 is shown contained within the shield and microwave redirection apparatus 70. The height of the shield and microwave redirection apparatus 70 is typically set to protect the head of the user of the apparatus 10 while the telephone or wireless personal communication apparatus 10 is in use and to extend the microwave radiation and transmission range of the apparatus.

An alternate embodiment of the shield and microwave redirection apparatus 70 of FIGS. 1 and 2 is shown in FIGS. 3 and 4. The shield apparatus of FIGS. 4 and 5 comprises a shield and microwave redirection apparatus 80 secured to and extending upwardly from, the top 14 of the telephone or wireless personal communication apparatus 10.

Shield and microwave redirection apparatus 80 shown in FIGS. 3 and 4 comprises only a segmental blocking shield and microwave redirection apparatus 82 disposed between the user of the apparatus 10. The head of the user is adjacent to the speaker portion 32 and the antenna 40 use of the telephone or wireless personal communication apparatus 10. With the shield 82 being only a segmental portion, the antenna is free from any type of obstruction on the opposite side of the shield apparatus 80 relative to the head of the user of the apparatus 10.

FIGS. 5 and 6 illustrate sequential views of the antenna 40 in use with another alternate shield and microwave redirection apparatus embodiment 84.

In FIG. 5, the telephone or wireless personal communication apparatus 10 is shown with an antenna well 60 which extends downwardly from the top 14 of the case 12. In the art, it is well known and understood that an antenna, such as the antenna 40, may be made of a segment or of concentric segments which may be retracted into a well within the telephone or personal communication apparatus housing. Upon usage of the telephone or personal communication apparatus, the antenna is extended, and the segment and/or segments extend upwardly and outwardly as they are pulled out by the user of the telephone or personal communication apparatus.

In FIG. 5, the well 60 is shown with the antenna 40 in its down or collapsed or telescoping orientation within the well 60. In FIG. 6, the antenna 40 is shown extending outwardly from the case 12 and outwardly from the antenna well 60. It will be noted that the electrical connections, well known and understood in the art, have been omitted from both FIGS. 5 and 6.

The shield and microwave redirection apparatus 84 is shown in FIG. 5 extending downwardly into the well 60 and accordingly surrounding the bottom of the antenna 40. The antenna 40, as shown, includes four telescoping segments, an outer bottom segment 42, a first inner segment 44, a second inner segment 46, and a third and innermost segment 48. A button 50 is secured to the top of the innermost segment 48.

With the antenna 40 in its down or nesting orientation, as illustrated in FIG. 5, the shield apparatus 84 is disposed almost entirely within the well 60 and about the antenna. With the extension of the antenna 40, as shown in FIG. 6, the shield and microwave redirection apparatus 84 is moved upwardly with the antenna segments as the antenna is raised. The shield and microwave redirection apparatus 84 is disposed about the lower portions of the antenna, namely the segments 42 and 44 and accordingly protects the user from the radiation and redirects the microwave radiation away from the user.

The shield 84 includes two portions, a blocking or shield and microwave redirection portion 86, which is directed toward the user of the telephone apparatus 10, and an open portion 88, which is directed away from the user and through which radio frequency radiation passes without absorption. The blocking or shield and microwave redirection portion 86 absorbs and redirects the microwave radiation away from the user of the apparatus 10.

FIGS. 7, 8, and 9, illustrate another embodiment of the shield and microwave redirection apparatus of the present invention. FIG. 7 is a perspective view of a washer 100 which is disposed about the bottom of an antenna 140 and on the top surface 14 of the telephone or personal communication case 12. The washer 100 is used to secure a fixed shield and microwave redirection sheath 90 to the antenna 140. It will be noted that, with the shield apparatus 90 and its washer 100, the antenna 140 must be raised to its up position and must remain there within the shield and microwave redirection apparatus 90. If the telephone or wireless personal communication apparatus is a cellular phone with a fixed antenna, then there is no problem of inconvenience due to the inability to retract the antenna. Essentially, the alternate embodiment 90 comprises a universal blocking and microwave redirection element which may be fitted to a number of different portable or cellular telephones or personal communication apparatus. Typically, the shield apparatus 90 will be fitted to a cellular telephone or wireless personal communications apparatus having a fixed antenna.

The alternate embodiment 90 includes a shield and microwave redirection sheath 92 which is generally of a cylindrical configuration. There is an inner bore 94 within the sheath 92. The sheath 92 and the bore 94 are closed by a top 96. At the bottom of the sheath 92 is a tapered portion 98, best shown in FIG. 9. The tapered portion 98 is disposed against, and appropriately secured to, the washer 100.

FIG. 7 is a perspective view of the washer 100. FIG. 8 is a perspective view of the portable telephone or wireless personal communication apparatus 10, with the washer 100 disposed about the bottom of the antenna 140, and the antenna 140 is shown raised to its highest or uppermost open position. FIG. 9 is a side view in partial section showing the washer 100 secured to the top 14 of the telephone or wireless personal communication apparatus 10, and the sheath 92 is shown secured to the washer 100.

Note that the antenna 140 is a fixed length antenna, and not telescoping.

The washer 100, perhaps best shown in FIG. 7, includes a lower cylindrical portion 102 with an upper tapering portion 104. The tapering portion 104 extends from the lower cylindrical portion 102 to a top 106. A bore 108 extends through the washer 100 from the top 106 to the bottom of the washer. A radially extending slot 110 extends through the washer, including through both the lower bottom cylindrical portion 102 and the upper tapering portion 104.

For securing the washer 100 to the top 14, and about the lower portion of the antenna 140, the washer 40 is opened at the slit 110 and the washer is then fitted about the lower portion 42 of the antenna 40. The bottom of the washer 100 is placed on the top 14, and may be adhesively secured thereto.

The sheath 92 is placed over the antenna. The bottom tapering portion 98 of the sheath 92 is disposed against the tapering wall or portion 104 of the washer 100. The tapering portion 98 at the bottom of the sheath 92 matches the taper 104 of the washer 100. If desired, the sheath 92 may be adhesively secured to the washer 100. The shield and microwave redirection apparatus 90 accordingly becomes a relatively permanent part of the telephone or wireless personal communication apparatus 10.

The shield and microwave redirection apparatus 90 includes a blocking and microwave redirection portion and an open portion, such as discussed above. The blocking and radiation redirecting portion is disposed adjacent to, or in the direction of, the speaker portion 32 of the telephone or personal communication apparatus 10, and accordingly in the direction or towards the user of the telephone or personal communication apparatus. The "open" portion is directed away from the user.

The washer 100 may preferably also include two portions, again a blocking and microwave redirecting portion which is oriented towards the user and an unblocked or open portion which is directed away from the user to allow the transmitted electromagnetic radiation from the antenna 140 to radiate or flow outwardly therefrom.

Returning again to FIGS. 2, 3, and 4, the blocking and radiation redirection portions of the shields discussed above are shown as comprising an arcuate extent of about 180 degrees. It may very well be that a lesser arcuate extent will be just as effective in blocking the potentially harmful radiation from the antenna 40 (and also from the antenna 140), and from associated portions of the telephone or wireless personal communication apparatus 10. For example, it may be that an arcuate length of only about 120 degrees, or even perhaps less, is necessary. On the other hand, it may be that a full 180 degrees is desired for maximum radiation protection.

Referring again to FIG. 5, the shield and microwave redirection portion 84 is shown extending down into the antenna well 60. If desired, the shield, or particularly the absorption, blocking and microwave radiation redirection portion thereof, may permanently extend down into the well about the antenna and may also be disposed between the user of the telephone or wireless personal communication apparatus and any other portions within the case 12 which may discharge electromagnetic radiation.

Similarly, radiation blocking or absorbing portions may also be disposed about the case 12 where a user typically holds on to the hand set, or wireless personal communication apparatus, if desired. In such case, the blocking and/or absorption materials would provide a shield for the hand of the user as the user holds the telephone or personal communication apparatus.

FIG. 10 is a top view of an alternate embodiment of the washer apparatus 100. FIG. 10 comprises a top view of washer apparatus 120 which is a generally universal type washer.

Since the diameter of an antenna varies from one telephone or personal communication apparatus to another, the washer apparatus 100 has been configured to fit a wide range of telephone or personal communication apparatus antenna. The washer apparatus 120 includes a cylindrical portion 122, which is substantially identical to the cylindrical portion 102. From the cylindrical portion, there is an upwardly extending tapering portion 124 which extends upwardly to the top of the washer. There are three concentric rings, including an outer concentric ring 126, a middle concentric ring 128, and an inner concentric ring 130. The inner concentric ring 130 includes an inner bore 132. A slot 134 extends through the washer 120, including through the lower cylindrical portion 122, the tapered portion 124, and through all three of the concentric rings 126, 128, and 130, from the inner bore 132 radially outwardly.

The concentric rings 126, 128, and 130 are scored at their outer peripheries to allow them to be removed, as desired, to provide an inner diameter for the washer apparatus 120 which will fit reasonably snugly against the outer diameters of antennae of various sizes.

The bore 132 of the inner ring 130 is configured to fit the smallest antenna, while the removal of all three of the concentric rings will leave a bore which is substantially the same as the outer diameter of the largest of the known antennae. Thus, the washer 120 may be sold with the sheath 92 to fit virtually all antennae in use with various types of hand held telephones or personal communication apparatus.

FIG. 11 comprises a block diagram illustrating the fabrication of the absorption, blocking, and microwave redirection shields discussed above, essentially, the shields are made of a binder or base carrier product that blocking agents will be mixed with. There are different types of blocking agents which form radiation or wave absorption materials. Relatively popular, ferromagnetic materials include carbonyl iron or ferrite oxide mixed with other oxides or ferrites or garnet, and materials such as magnesium, nickel, lithium, yttrium, and/or calcium vanadium. The particle sizes of the blocking agents range from typically about four microns to about 20 microns. The particle size and ferrite content of the mixture depends generally on the frequency of the radiation to be blocked.

Various types of binders may be used with the blocking agents. For example, silicone, epoxy, neoprene, or polyvinyl chloride are all satisfactory binder materials for the blocking agents.

Sequentially, the frequency range of the radiation to be blocked is first determined. After the frequency range is determined, the desired absorption and blocking agent and/or agents and a particle size and/or sizes for the absorption and blocking agent is selected. The absorption and blocking agent is then mixed with the appropriate binder.

If a full 360 degree shield is used, such as shown in FIGS. 1, 2, 5, 6, 8, and 9, then the sheath will be made in two parts, a part which includes the absorption and blocking material and a part that is free of the absorption and blocking material, but only the binder. The two portions will then be appropriately joined together to define a full 360 degree sheath. When only a segmental shield is to be used, such as shown in FIGS. 4 and 5, then the extra, blocking free binder portion need not be made.

Figure 13:
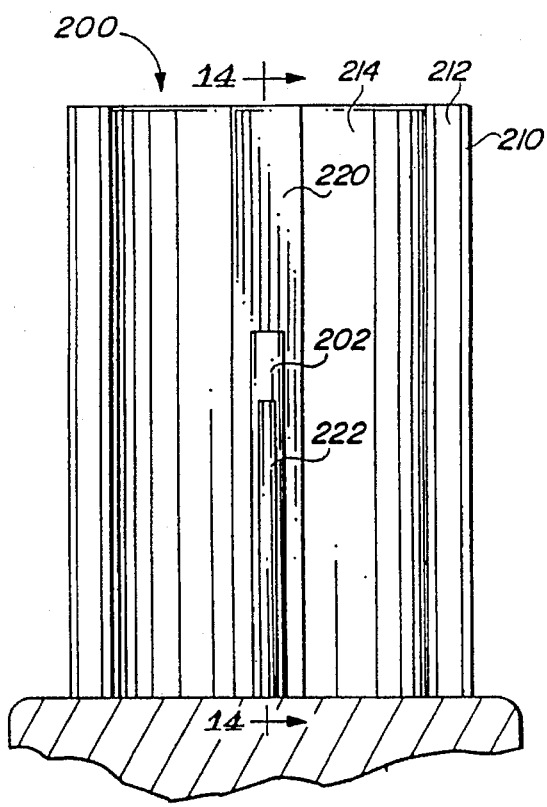
FIG. 13 is a side view of the apparatus of FIG. 12.
Figure 14:
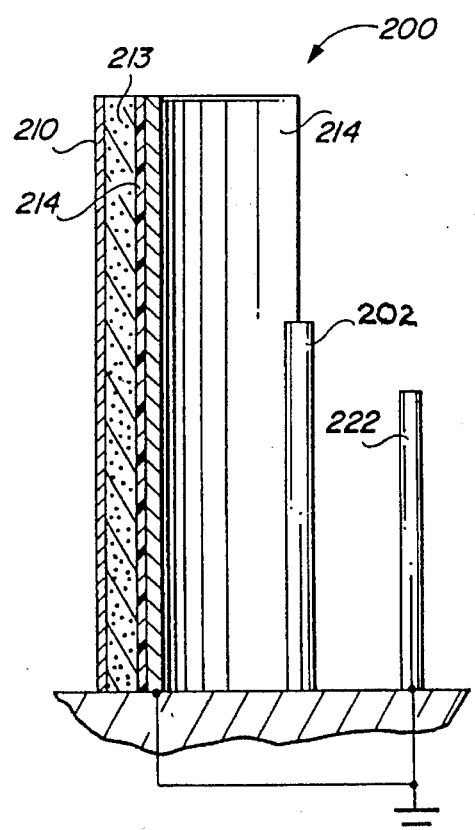
FIG. 14 is a view in partial section taken generally along line 14—14 of FIG. 13.

FIG. 12 comprises a top view schematically illustrating an alternate embodiment of the shield apparatus of the present invention, comprising shield apparatus 200. The inventive shield apparatus 200 may comprise a portion of an antenna assembly for a radio transmitting device, such as the telephone or wireless personal communication apparatus 10. FIG. 13 is essentially a front of the apparatus 200, taken generally along line 13—13 of FIG. 12. FIG. 14 is a side view in partial section of the shield apparatus 200, taken generally along line 14—14 of FIG. 13.

For the following discussion, reference will be made to FIGS. 12, 13, and 14.

The shield apparatus or shield means 200 is illustrated as a semicircular elongated shield member disposed about an antenna 202 for an arcuate distance of about 180°. The antenna 202 is disposed at about the center of a circle of which the shield apparatus 200 comprises a semicircular portion. The shield apparatus 200 includes, with respect to the semicircular portion, three elements, an outer metallic shield 210, a ferromagnetic or non-microwave ferrite material layer (radiation absorbing layer) 212 disposed against the outer shield layer 210, and an inner lining layer 214. The purpose of the inner lining layer 214 is merely to hold the ferrite material layer 212 in place against the outer shield 210.

One or two metallic parasite and microwave redirection elements, including a plate 220 which comprises an inner parasitic element, and an outer parasitic element 222, may each be employed separately or together and are shown aligned with the antenna 202. The parasitic element 220, 222 comprise directing means for directing the electromagnetic radiation emitted by the antenna 202 away from the user of the apparatus 200 and thus to extend the transmission range of the communications apparatus with which the shield 200 is being used.

When the outer element 222 is used, a line extending from the outer element 222, through the center of the antenna 202, bisects the plate 220, and also bisects the shield layers 210 and 212.

The inner parasitic element 220 comprises a flat plate appropriately secured to the inner lining 214. As best shown in FIGS. 13 and 14, the overall height of the inner parasitic element 220 is substantially the same as the outer shield 210 and the magnetic material layer 212.

The height of the antenna 202 is substantially less than the height of the parasitic element 220 and the shield layers 210 and 212. When used, the height of the outer parasitic element 222 is somewhat less than the height of the antenna 202. The relative heights may be understood from FIGS. 13 and 14.

As illustrated in FIG. 14, when employed together, the parasitic elements 220 and 222 are appropriately electrically connected together and extend to a circuit ground.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Shield apparatus for shielding a user from electromagnetic radiation emanating from an antenna of a radio signal transmitting device, the shield apparatus comprising:

shielding means disposed during use of the radio signal transmitting device between the antenna and the user, the shielding means being effective for shielding the user from electromagnetic radiation emanating from the antenna in a direction toward the user by absorbing the electromagnetic radiation; and directing means for directing at least a portion of the electromagnetic radiation emanating from the antenna in a direction away from the user, the directing means including a first metallic element disposed adjacent to the antenna and disposed so that during use of the radio signal transmitting device the shielding means is disposed between the first metallic element and the user, a second metallic element disposed so that the antenna is disposed between the first metallic element and the second metallic element, the first metallic element and the second metallic element being effective for directing the electromagnetic radiation in the direction away from the user.

2. The shield apparatus according to claim 1; wherein the shielding means comprises particles effective for absorbing electromagnetic radiation and binding means for binding the particles.

3. The shield apparatus according to claim 2; wherein the shielding means comprises a sleeve disposed over the antenna and includes a first portion having the particles and the binding means for absorbing the electromagnetic radiation and a second portion through which the electromagnetic radiation is transmitted.

4. A radio signal transmitting device, comprising:

a handset:

an antenna for transmitting electromagnetic radiation from the handset:

shielding means disposed during use between the antenna and a user of the radio signal transmitting device, the shielding means for absorbing electromagnetic radiation emanating from the antenna in a first direction toward the user, the shielding means comprising particles for absorbing the electromagnetic radiation and binding means for receiving and binding the particles; and directing means comprising a first parasitic element disposed adjacent to the antenna and a second parasitic element disposed remote from the first parasitic element and aligned with the first parasitic element and the antenna for directing the electromagnetic radiation in a second direction away from the user.

5. The radio signal transmitting device according to claim 4; wherein the shielding means comprises a sleeve disposed about the antenna, the sleeve includes a first portion having the particles and the binding means and being effective for absorbing the electromagnetic radiation and a second portion through which the electromagnetic radiation is broadcast.

6. The radio signal transmitting device according to claim 4; wherein the antenna is movable from a down position within the handset to an up position above the handset; and the shielding means is movable with the antenna.

7. The radio signal transmitting device according to claim 4; wherein the shielding means comprises an arcuately extending shield member secured to the handset adjacent to the antenna.

8. The radio signal transmitting device according to claim 9; wherein the first parasitic element is disposed against the arcuately extending shield member.

9. The radio signal transmitting device according to claim 4; wherein the antenna is disposed between the first and second parasitic elements.

10. The radio signal transmitting device according to claim 4; wherein the shielding means includes a first layer of ferromagnetic or non-microwave ferrite material.

11. The radio signal transmitting device according to claim 10; wherein the shielding means further includes a metallic layer secured to the first layer.

12. An antenna assembly for use with a radio signal transmitting device, comprising: an antenna for transmitting a radio signal from a radio signal transmitting device: shielding means comprising a radiation absorbing layer, the shielding means being disposed during use of the radio signal transmitting device between the antenna and a user; and directing means comprising a first parasitic element disposed during use between the antenna and the user, and a second parasitic element disposed during use so that the antenna is between the second parasitic element and the user, the first parasitic element and the second parasitic element being effective to direct a portion of the radio signal transmitted from the antenna in a direction away from the user so as to extend the transmission range of the radio signal transmitting device.

13. An antenna assembly according to claim 12; wherein the at least one parasitic element comprises an electrically grounded parasitic element electrically connected to a circuit ground of the radio signal transmitting device.

14. An antenna assembly according to claim 12; wherein the radiation absorbing layer includes particles effective for blocking the radio signal transmitted from the antenna in a direction toward the user, and a binder for binding the particles.

15. An antenna assembly according to claim 14; wherein the binder comprising at least one of silicone, epoxy, neoprene and polyvinyl chloride.

16. An antenna assembly according to claim 12; wherein the shielding means further comprises a metallic shielding layer disposed during use between the radiation absorbing layer and the user.

* * * * *